(12) United States Patent
Kuenzner

(10) Patent No.: US 8,199,105 B2
(45) Date of Patent: Jun. 12, 2012

(54) SYSTEM AND METHOD FOR CONTROLLING CURSOR MOVEMENT

(75) Inventor: Hermann Kuenzner, Freising (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 808 days.

(21) Appl. No.: 12/248,706

(22) Filed: Oct. 9, 2008

(65) Prior Publication Data
US 2009/0122009 A1 May 14, 2009

Related U.S. Application Data

(63) Continuation of application No. PCT/EP2007/002053, filed on Mar. 9, 2007.

(30) Foreign Application Priority Data

Apr. 11, 2006 (DE) .......................... 10 2006 016 898

(51) Int. Cl.
*G09G 5/08* (2006.01)
(52) U.S. Cl. ........... 345/157; 463/37; 345/161; 345/184
(58) Field of Classification Search .......... 345/156–167, 345/184; 463/37, 38; 74/471; 200/6 A, 200/6 R
See application file for complete search history.

(56) References Cited

U.S. PATENT DOCUMENTS

| 5,270,689 | A |   | 12/1993 | Hermann |  |
|-----------|---|---|---------|---------|--|
| 5,666,138 | A | * | 9/1997  | Culver  | 345/161 |
| 5,883,346 | A |   | 3/1999  | Stoecken |  |
| 6,057,826 | A | * | 5/2000  | Gaultier et al. | 345/157 |
| 6,154,201 | A | * | 11/2000 | Levin et al. | 345/184 |

FOREIGN PATENT DOCUMENTS

| EP | 0 366 132 B1 | 5/1990 |
| EP | 0 796 766 A2 | 9/1997 |

* cited by examiner

*Primary Examiner* — Lun-Yi Lao
*Assistant Examiner* — Tom Sheng
(74) *Attorney, Agent, or Firm* — Crowell & Moring LLP

(57) ABSTRACT

A system and method are provided for controlling the movement of a cursor relative to an image displayed in a video screen display by way of an operating element that is rotatable about its longitudinal axis, while being moveable is at least two additional degrees of freedom transverse to the longitudinal axis thereof from an initial position. The cursor can be moved in two mutually perpendicular directions, and, in the case of an additional rotation of the operating element, during the transverse movement of the cursor, the cursor can be moved in a direction diagonal thereto.

15 Claims, 5 Drawing Sheets

*PRIOR ART*

SYSTEM AND METHOD FOR CONTROLLING CURSOR MOVEMENT

CROSS-REFERENCE TO RELATED APPLICATIONS

This application is a continuation of PCT International Application No. PCT/EP2007/002053, filed Mar. 9, 2007, which claims priority under 35 U.S.C. §119 to German Patent Application No. DE 10 2006 016 898.4, filed Apr. 11, 2006, the entire disclosures of which are herein expressly incorporated by reference.

BACKGROUND AND SUMMARY OF THE INVENTION

The invention relates to a system and method for controlling the movement of a cursor relative to an image displayed in a video screen display by use of an operating element that is rotatable about its longitudinal axis.

A system of this type is known from European patent document EP 0 796 766 A2. In this case, the operating element functions to increase the number of levels within a menu structure. For this purpose, it is indicated to arrange the levels such that they are distributed about the circumference of the video screen display. Such a system, however, provides a certain difficulty for the user because he finds no unambiguous assignment between the additional movement of the operating element and the axial or rotational movement of this part. The transition between the levels and within the menu structure also does not take place in a form that is unambiguous to the user. Finally, it has the overall effect that the user is distracted considerably from the traffic situation at hand.

There is therefore needed a system and method of the above-mentioned type wherein an unambiguous assignment exists between the video screen display and the different movement possibilities of the operating element.

This need is met according to the invention, which provides a system and method for controlling the movement of a cursor relative to an image displayed in a video screen display by use of an operating element that is rotatable about its longitudinal axis. Starting from an initial position, the operating element can carry out movements transversely with respect to its longitudinal axis with two additional degrees of freedom and, in this case, the cursor can be moved in two mutually perpendicular directions. In the case of an additional rotation of the operating element, during the transverse movement of the cursor, the cursor can be moved in a direction diagonal thereto.

By use of the operating element, the movement of the cursor in the video screen display can be controlled in various manners. As a result of transversely moving the operating element, movements in two degrees of freedom can be carried out. As a result of an additional rotation of the operating element during the transverse movement, the cursor can be moved in a direction that is diagonal thereto. An arbitrary point within the display can, thereby, be approached rapidly and reliably. A possibly existing axial movement of the operating element is not required for the overall position control of the cursor and may, as described in detail below, be used for further functionalities.

Embodiments of the inventions can be obtained in multiple manners. On the one hand, the transverse movement of the operating element may have different forms. For example, it may be a transverse or a tilting movement. In addition, a restricted guidance may also be provided for this purpose. As a result, the cursor can be moved without error in both baseline directions. This movement can advantageously take place as long as the operating element is deflected from its initial position.

The diagonal movement triggered by the rotation of the operating element may also be different. Thus, the diagonal angle may be fixed and, for example, equal to 45°. As an alternative, the diagonal angle may correspond to the angle of rotation of the operating element. This results in a large variation in the movement control and in the advantage of being able to reliably move to arbitrary points on the display. During the movement, the direction of the movement can always be corrected again by a corresponding rotation of the operating element.

Advantageous further developments of the invention are described and claimed herein.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 6 illustrate the movement of a cursor controlled by way of the system and method according to the invention in a video screen display.

Figure 1:
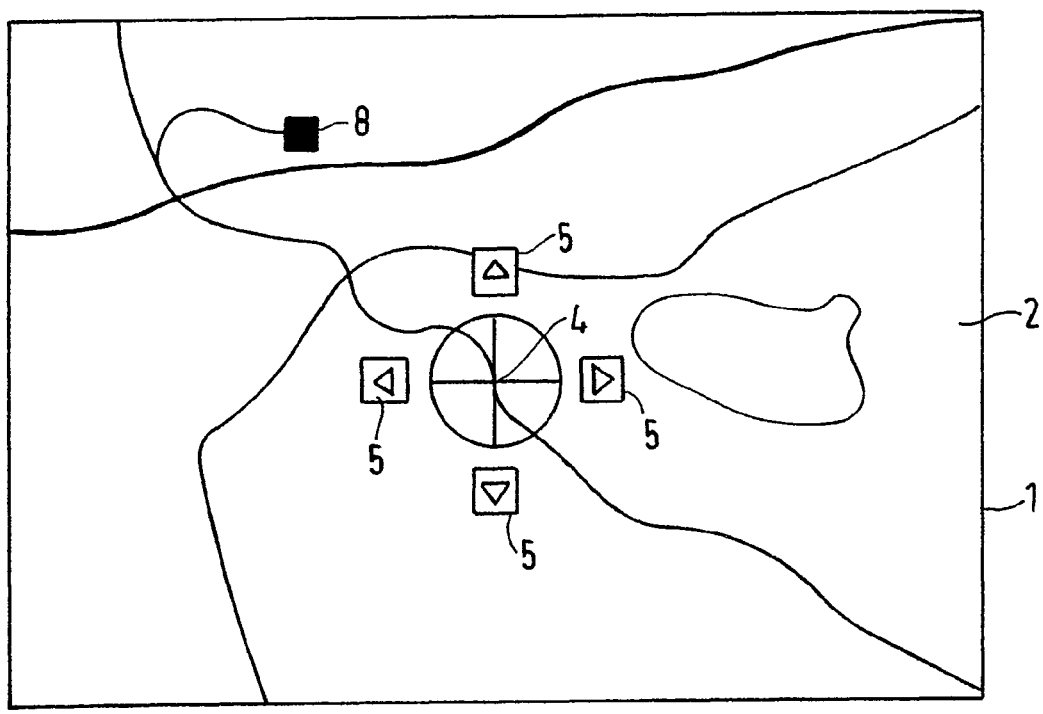
FIG. 1 provides a basic view of a video screen display operated in accordance with the present invention.
Figure 8:
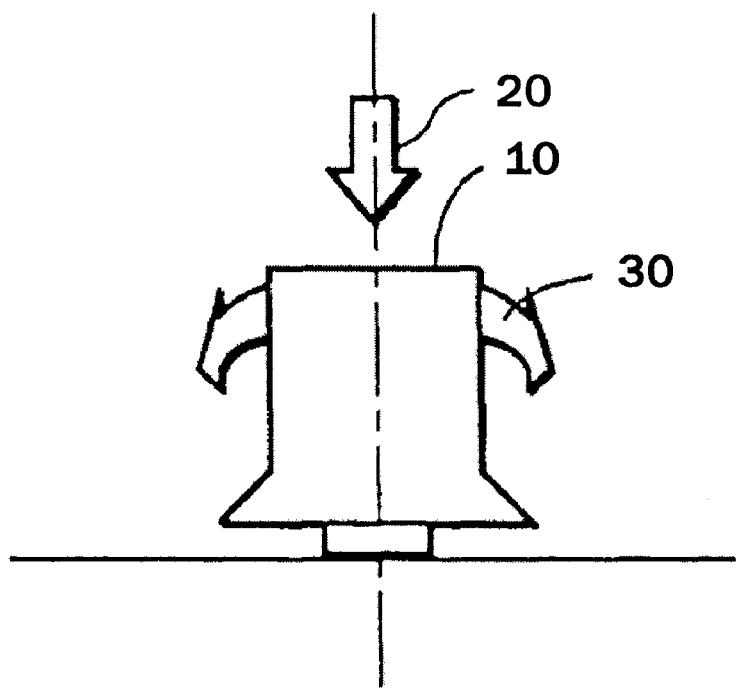
FIG. 8 illustrates an operating element of the prior art usable in connection with one or more embodiments of the invention.

FIG. 1 is a basic view of the video screen display provided within the scope of the invention. Within a display area 1, which is equal to the image area of a video screen, a picture of a map cutout 2 and, in the center area, a cursor 4 shown as a crosshair are situated. Arrows 5 are inserted for illustrating the basic movement possibilities of the cursor 4. The arrows symbolize movements into the four cardinal points. The cursor 4 can be moved by tilting an operating element (not shown). The operating element is a rotary/push button 10 of FIG. 8, as is known from European patent document EP 0 366 132 B1 (having U.S. counterpart U.S. Pat. No. 5,270,689) (the '689 patent), and which additionally can be tilted from its vertical starting position in two mutually perpendicular planes. FIG. 8 is a reproduction of FIG. 1 from the '689 patent and shows how the rotary/push button 10 can be rotated around an axis of rotation, as indicated by arrow 30, and can be moved in an axial direction, as indicated by an arrow 20. Corresponding to the tilting direction, the cursor 4 is moved relative to the map cutout 2 while the operating element is tilted.

Figure 2:
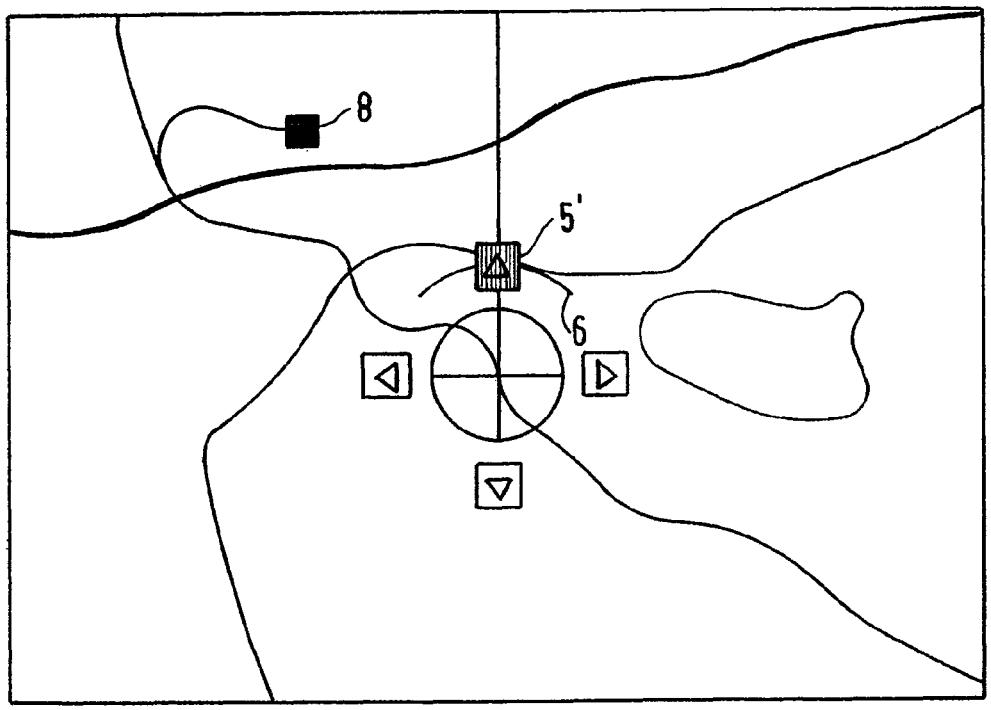
FIG. 2 illustrates a starting point for the cursor movement control on the video display screen according to an embodiment of the invention.
Figure 3:
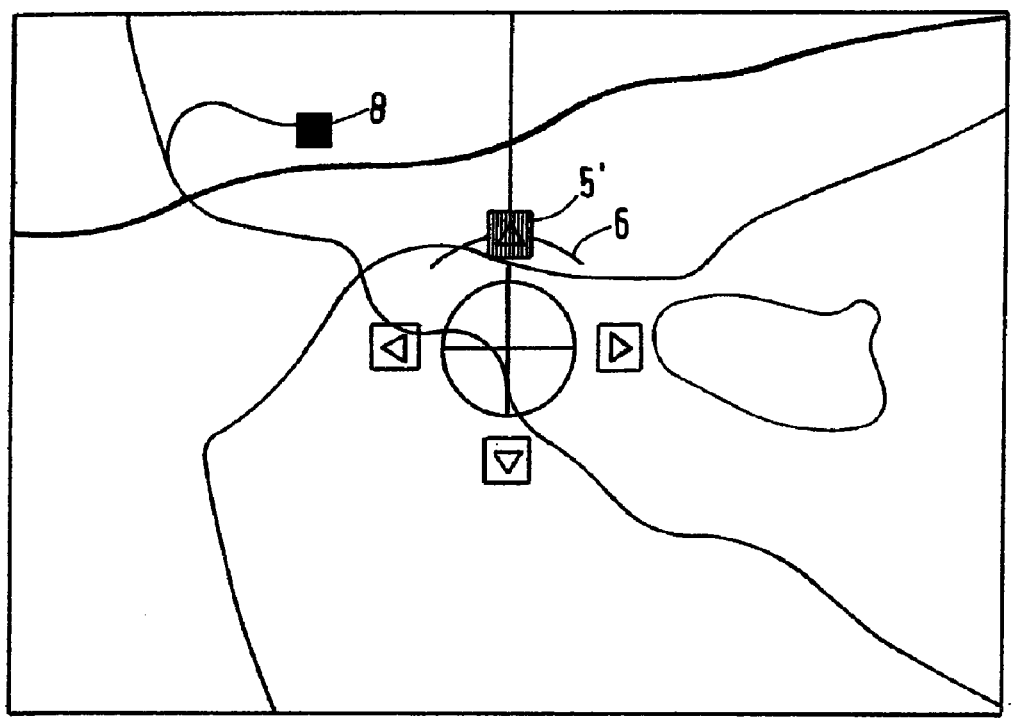
FIG. 3 illustrates a first movement of the cursor on the video display screen in accordance with an embodiment of the invention.

As illustrated in FIGS. 2 and 3, a tilting of the operating element is assumed by which a movement of the cursor 4 to the North is achieved ("North" being toward the "top" of each map cutout). For the purpose of clarity, this tilting takes place by a movement of the operating element which is toward the "front" or "forward" in a top view. FIG. 2 shows the starting point; FIG. 3 shows the position of the cursor after a defined movement has been carried out. In addition, the actual moving direction (here: North) is illustrated as a visual aid by a highlighted visual representation of the relevant arrow 5'. As an additional visual aid, a circular arc 6 is also inserted, which symbolizes the possibility according to the invention of moving the cursor 4 also diagonally relative to the map cutout 2.

Figure 4:
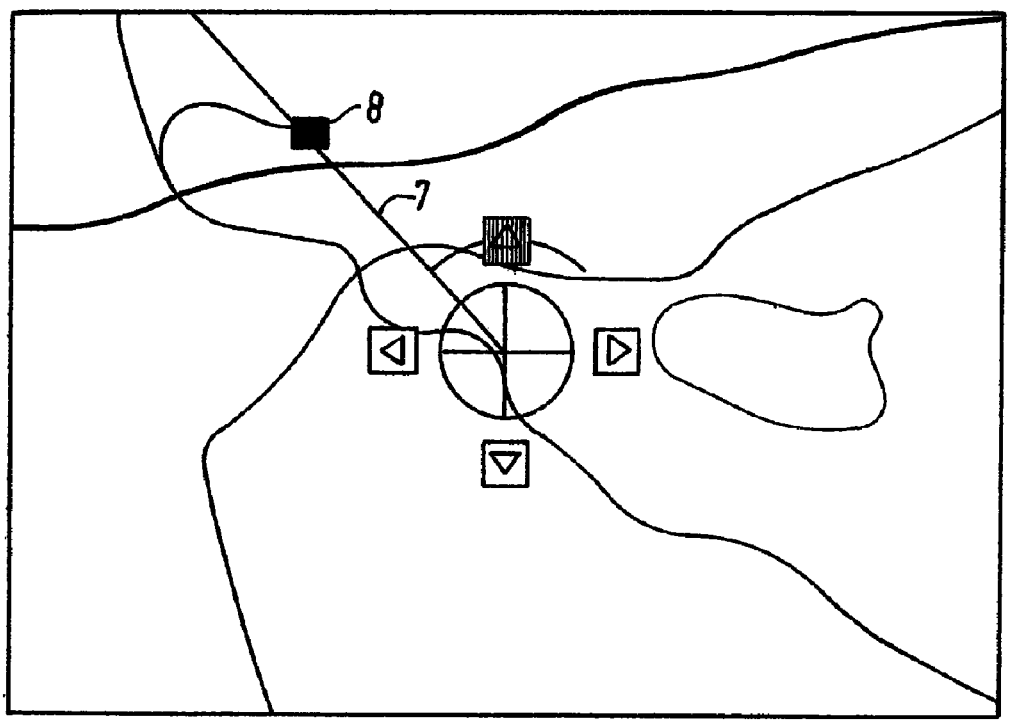
FIG. 4 illustrates a further movement of the cursor on the video display screen in accordance with an embodiment of the invention.

This diagonal movement of the cursor 4 is achieved by rotating the operating element in its tilted condition additionally relative to its longitudinal axis. During a rotating movement of the operating element toward the left in the top view, the cursor 4 carries out a diagonal movement toward the left top (Northwest) as long as the operating element is tilted forward and rotated toward the left. The actual movement direction of the cursor 4 is illustrated in FIG. 4 and is reflected by another visual aid in the form of a directional vector 7. As a result, desired objects of the map cutout 2, here, illustrated as a filled-in square 8, can be sighted.

Figure 5:
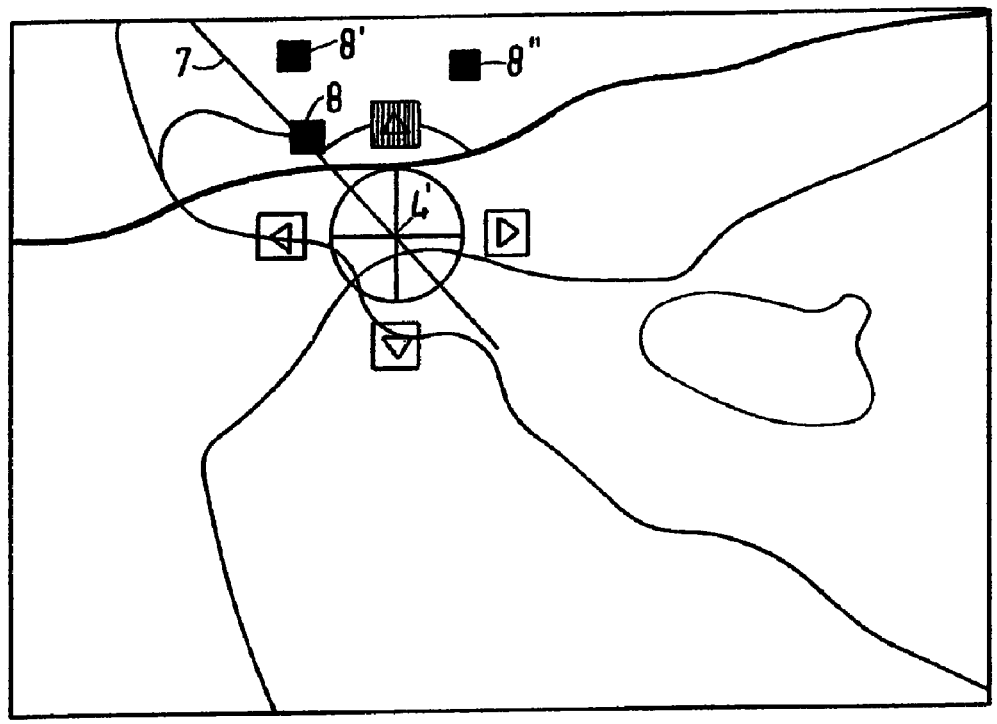
FIG. 5 illustrates a diagonal movement of the cursor on the video display screen in accordance with an embodiment of the invention.
Figure 6:
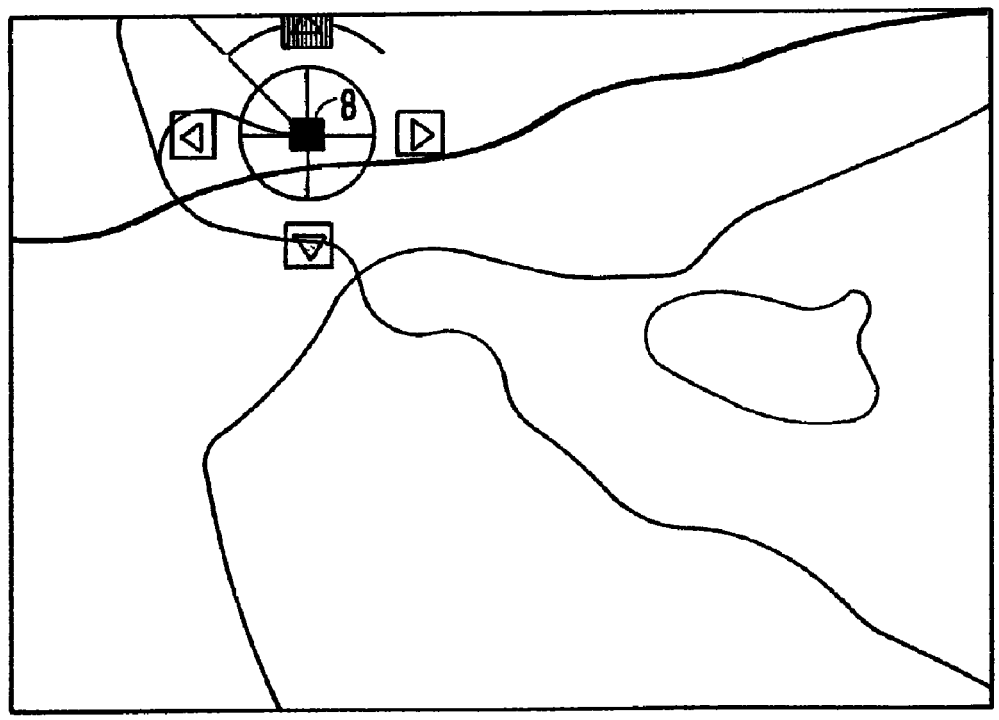
FIG. 6 further illustrates a diagonal movement of the cursor on the video screen display in accordance with an embodiment of the invention.

The movement of the cursor 4 is further illustrated in FIGS. 5 and 6. As long as the operating element is tilted forward, the cursor 4 will move along the directional vector 7 and reach the square 8. When the user now releases the operating element, it moves from its tilted position back into the vertical starting position, in which case movement of the cursor 4 stops. The directional vector 7 and the circular arc 6 continue to be indicated on the display in order to demonstrate the adjusted moving direction of the cursor 4. If the operating element were to again be tilted forward, the cursor 4 would move on the directional vector 7. If the operating element were to be tilted backward, the cursor would be moved exactly in the opposite direction. A tilting of the operating element toward the left or right would result in a movement of the cursor in a direction rectangular thereto toward the left or right. By rotating the tilted operating element to the right, the movement of the cursor can be set back to vertical and horizontal.

The adjustment of the diagonal angle at which the cursor is moving may correspond to the angle of rotation of the operating element. The angle of rotation of the operating element may also be adjustable in a catch or stop-type manner and, as required, in a manner limited by mechanical catches or stops. This results in an unambiguous assignment between the diagonal angle of the cursor movement and the angle of rotation of the operating element.

Figure 7:
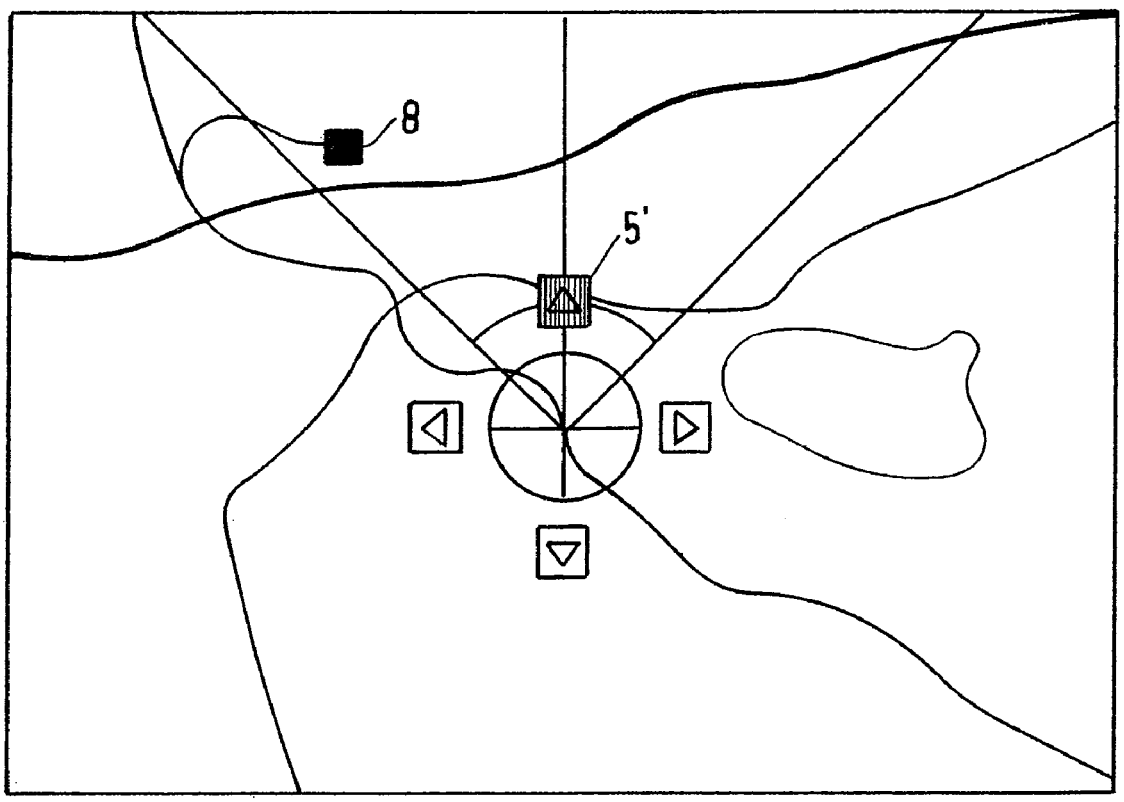
FIG. 7 illustrates a cursor movement sector on the video screen display in accordance with an embodiment of the invention.

Likewise, it is contemplated to limit the diagonal angle at which the cursor is moving by a corresponding method of operation of the software, which carries out the implementation of the control commands from the operating element into corresponding cursor movements. When the operating element works with stop positions, the diagonal angle of the cursor movement can also be changed in a catch-type manner up to a maximal value. A continued movement of the operating element will then have no further effect; that is, the cursor will then no longer be moving. During a movement of the operating element in the opposite direction, the diagonal angle at which the cursor is moving can immediately be reduced again. The sector for the contemplated cursor movement, which can be swept by rotating the operating element, can be graphically illustrated on the map cutout 2 by a corresponding brightening. As a result, the user sees immediately whether he can reach the desired location on the map. This is illustrated in FIG. 7.

When the directional vector 7 is rotated, an additional function could also be activated. In this case, the operating element can again be rotated with stop positions. The directional vector 7 is shaped in the manner of a search beam rotatable about the center 4', the angle of rotation of this search beam being changed with every stop position of the operating element. When several objects are provided within the map cutout 2, the angle of rotation of the search beam 7 is variably adapted to the position of the points in such a manner that the search beam hits precisely one clearly defined point in each stop position; that is, with each stop position of the operating element, the directional vector continues to be switched to a special point on the map. This would be useful, for example, for identifying points of interest (for example, gas stations and the like).

This operation is explained by way of FIG. 5. Starting from the initial position illustrated in FIG. 5, in which the directional vector 7 as the search beam "hits" the square 8, the additional objects of the map cutout 2 (here, illustrated as squares marked 8' and 8") may be "hit" successively and directly in that the operating element is in each case rotated by one stop position to the right.

The movement of the cursor can take place as described as long as the operating element is deflected from the initial position. It may also be automatically continued after a brief deflection of the operating element and may be terminated after a predefined time or when a marking point (here, the square 8) has been reached.

Finally, as known per se, the operating element may be axially movable and, during an axial movement of the operating element, information assigned to the respective cursor position may be displayed. This may, for example, be information concerning the site symbolized by square 8. For example, starting from the situation illustrated in FIG. 5, in which the search beam hits the object (square 8), the cursor 4 may immediately be placed on the object during the axial movement. This situation is illustrated in FIG. 6.

In this manner, it becomes possible to rapidly and reliably move the cursor 4 in different directions within a map cutout.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for controlling movement of a cursor relative to an image, the system comprising:
    a video screen display for displaying the image;
    an operating element operatively coupled with the video screen display to control movement of the cursor, the operating element being rotatable about its longitudinal axis and moveable transversely with respect to the longitudinal axis in two additional degrees of freedom; and
    wherein, beginning from an initial position, movement of the operating element transversely with respect to the longitudinal axis in the two additional degrees of freedom controls movement of the cursor in two mutually perpendicular directions, respectively, on the video screen display; and
    wherein, during transverse movement of the cursor, rotation of the operating element angularly changes the two mutually perpendicular directions corresponding to the two additional degrees of freedom such that, following said rotation of the operating element, additional transverse movement of the operating element in either of said two additional degrees of freedom controls the movement of the cursor in a diagonal direction on the video screen display wherein the transverse movement(s) of the operating element occurs via a tilting of the operating element or a parallel displacement of the operating element relative to the initial position.

2. The system according to claim 1, wherein the operating element is restrictedly guided in the transverse movement.

3. The system according to claim 1, wherein an angle of the diagonal direction is a function of the rotational angle of the operating element.

4. The system according to claim 1, wherein the cursor movement occurs only while the operating element is moved from the initial position.

5. The system according to claim 1, wherein the diagonal direction of the cursor movement corresponds to a rotational direction of the operating element.

6. The system according to claim 1, wherein at least one of the rotational movement of the operating element and an angular range swept by the rotational movement on the video screen display is limited.

7. The system according to claim 1, wherein a movement direction of the cursor is visually indicated on the video screen display.

8. The system according to claim 1, wherein the operating element includes stop positions for the rotational movement.

9. The system according to claim 8, wherein an adjustment of the cursor on the video screen display is assigned to each of the stop positions of the operating element, the adjustment of the cursor marking a clearly defined point in the video screen display.

10. The system according to claim 8, wherein an angular range that, as a whole, can be swept by rotational movement of the operating element, is indicated on the image of the video screen display.

11. The system according to claim 10, wherein the angular range on the video screen display is visually highlighted.

12. The system according to claim 1, wherein the operating element comprises an axial movement, wherein the axial movement of the operating element causes information assigned to a respective cursor position on the image of the video screen display to be displayed.

13. A method for controlling cursor movement over an image on a video screen display via an operating element that is rotatable about its longitudinal axis and moveable transversely relative to an initial position, the method comprising the acts of:
    moving the cursor over the image on the video screen display in two mutually perpendicular directions corresponding to two transverse movements of the operating element in the vertical and horizontal directions; and
    moving the cursor, following a rotational movement of the operating element about its longitudinal axis, in an angular direction relative to the two mutually perpendicular directions when the operating element is additionally moved transversely in one of the vertical or horizontal directions wherein the transverse movement(s) of the operating element occurs via a tilting of the operating element or a parallel displacement of the operating element relative to the initial position.

14. The method according to claim 13, further comprising the act of controlling the angular direction of the cursor in accordance with an angle of rotation of the operating element.

15. The method according to claim 13, wherein movement of the cursor occurs provided the operating element is not in the initial position.

* * * * *